(12) United States Patent
Philipp (10) Patent No.: US 6,288,707 B1
(45) Date of Patent: Sep. 11, 2001

(54) CAPACITIVE POSITION SENSOR

(76) Inventor: Harald Philipp, 651 Holiday Dr., Bldg. 5, Suite 300, Pittsburgh, PA (US) 15220

( * ) Notice: Subject to any disclaimer, the term of this patent is extended or adjusted under 35 U.S.C. 154(b) by 0 days.

(21) Appl. No.: 09/230,420

(22) PCT Filed: Jun. 12, 1997

(86) PCT No.: PCT/US97/10383

§ 371 Date: Jan. 25, 1999

§ 102(e) Date: Jan. 25, 1999

(87) PCT Pub. No.: WO98/05025

PCT Pub. Date: Feb. 5, 1998

Related U.S. Application Data

(60) Provisional application No. 60/016,107, filed on Jul. 29, 1996, and provisional application No. 60/023,689, filed on Aug. 15, 1996.

(51) Int. Cl.$^7$ ....................................................... G09G 5/00
(52) U.S. Cl. ............................ 345/168; 345/173; 341/22
(58) Field of Search ................................ 345/168, 173, 345/174, 160; 178/18.06, 18.08; 341/20, 22

(56) References Cited

U.S. PATENT DOCUMENTS

| | | | |
|---|---|---|---|
| 4,476,463 | * | 10/1984 | Ng et al. ............................. 345/174 |
| 4,622,437 | * | 11/1986 | Bloom et al. ...................... 178/18.05 |
| 4,736,191 | * | 4/1988 | Matzke et al. .......................... 341/20 |
| 5,365,461 | * | 11/1994 | Stein et al. ............................ 700/298 |
| 5,457,289 | * | 10/1995 | Huang et al. ...................... 178/18.08 |
| 5,914,465 | * | 6/1999 | Allen et al. ........................ 178/18.06 |

* cited by examiner

Primary Examiner—Richard Hjerpe
Assistant Examiner—Alexander Eisen
(74) Attorney, Agent, or Firm—David Kiewit (57) ABSTRACT

A multi-electrode capacitive position sensor functions as part of a computer pointing device that can be integrated with the computer's keyboard (20) and that employs ratiometric capacitive sensing techniques. This approach allows a computer user to move a cursor (12) about on a display (14) by skimming his or her fingers (24) over the keyboard (20) without actually depressing any of the keys. The preferred sensing arrangement comprises a circuit for first charging a resistive layer (16) disposed on an active portion of the keyboard and then discharging the layer (16) by simultaneously connecting each of several spaced apart electrodes (36) to respective inputs of a multi-channel charge detection circuit (40). For a one-dimensional pointing device, two or more charge transferring switches (62) and electrodes 36 are required, with two being the preferred number. For a two-dimensional pointing device, three or more charge transferring switches (62) and electrodes (36) are required, with four being a preferred number.

15 Claims, 5 Drawing Sheets

CAPACITIVE POSITION SENSOR

This application claims benefit to Provisional Application No. 60/016,107 filed Jul. 29, 1996, which claims benefit to Provisional Application No. 60/023,689 filed Aug. 15, 1996.

TECHNICAL FIELD

The sensor and its method of operation pertain to the determination of a position of an object adjacent a predetermined sensing area. In a specific embodiment the object is a part of an operator's body and an output from the sensor is used for moving a pointer or cursor on a computer screen under the operator's control. Representative similar devices are commonly known as 'mice', trackballs, joysticks, touch screens, touch pads and the like, and are collectively referred to as pointing devices.

BACKGROUND ART

Single-electrode capacitive sensors for sensing the proximate presence of an object are commonly used as non-contact electric switches (e.g., elevator call buttons), as part of a water valve controller for operating a wash basin valve in a public restroom, for monitoring the flow of objects on an assembly line and the like. Sensors of this sort are commonly configured to provide a binary output and operate by measuring a value of electrical capacitance to an electric ground. If the sensor is configured as a "proximity sensor" it provides an output determinative of proximate presence when the value of the measured capacitance exceeds a predetermined threshold valve. If the sensor is configured as a "motion sensor" it provides the determinative output when the rate of change of capacitance exceeds a predetermined threshold value.

Multi-electrode capacitive sensors having a plurality of electrodes disposed about a predetermined sensing area can determine the position of an object adjacent the area and, by making multiple measurements over a period of time, can determine the direction and speed of motion of the object. Although there are many possible applications for multi-electrode capacitive sensors (e.g., for controlling the intensity of a light or sound source responsive to an operator moving his or her hand across the sensing area), the application that appears to be of greatest interest is that of providing an input to a computer that uses the input to determine the position of a cursor on an associated display.

Over the past decade, pointing devices have become mandatory instruments for dealing with the increasingly graphical nature of computer user interfaces. At the same time, small, portable, battery-powered 'laptop' or 'notebook' computers have become increasingly popular. This popularity of laptop computers has produced a need for new pointing devices of increasingly small size to cope with the dramatic reduction in available keyboard and surrounding workspace.

Popular laptop pointing devices include inter alia (a) small trackballs on or adjacent the keyboard, b) tiny joysticks interposed among the keyboard keys, (c) capacitive touch pads, and (d) accessory mice to be used near the laptop, but not built into it. The joystick has been found wanting by many, as it is a limited movement 'velocity' device. That is, small amounts of force applied laterally to the stick cause the pointer to accelerate to a velocity proportional to the force and to move in the direction of the applied force. This less than convenient method requires considerable accommodation on the part of the user. Capacitive finger touch pads, which may share the same housing as the keyboard but which do not share an active typing area of the keyboard, offer a significant improvement by presenting a more substantial surface area to the user, and allowing movements that are generally more intuitive than those of a joystick. Neither method has the large usable area of a conventional mouse placed on an adjacent desk surface. The touch pad device also negatively affects the available keyboard layout, as it requires a large area in front of the keys. Users also report that their thumbs can accidentally strike the pad while typing, thus dislodging the pointer from its prior position, causing frustration.

Ng et al., in U.S. Pat. No. 4,476,463, disclose a pointing device responsive to the position of a user's finger adjacent a computer display overlaid with a resistive sheet having three or more electrodes spaced thereabout. In one embodiment, the position of the user's finger is determined from a sequence of capacitive measurements, each of which involves charging the sheet and then transferring charge from the sheet into an A to D converter. In a burst mode of operation this charge/discharge/measure sequence may be repeated a predetermined number of times to obtain an average value from which a distance (relative to the one electrode at which the measurement is taken) is determined. After all the electrodes have been interrogated, the position is determined (or over-determined) as the point satisfying all the distance criteria. Ng et al.'s teaching embraces an arrangement for resetting reference levels in the capacitive measurement to adapt to environmental changes.

Yoshikawa et al., in U.S. Pat. No. 4,680,430, teach a pointing device responsive to the position of a user's finger (which is capacitively coupled to ground) above a uniformly resistive layer of material. Yoshikawa et al. teach the use of their device as a coarse-resolution touch-screen input device, but do not disclose integrating their pointing device with a keyboard or keypad.

Matzke et al., in U.S. Pat. No. 4,736,191, teach a multi-electrode capacitive pointing device comprising an array of electrodes symmetrically disposed about a central point. Their array, which is operated by sequentially charging and discharging the electrodes to capacitively determine the position of a user's finger adjacent the device, is disposed near the keyboard of a computer.

Boie et al, in U.S. Pat. No. 5,463,388, teach a computer mouse or keyboard input device utilizing capacitive sensors. Their input device employs an array of metallic electrodes and detects the position of a user's finger from a centroid of capacitance values. The position information is used to either move the cursor (if the apparatus is being used as a pointing device) or to select a character to be input (if the apparatus is being used as a keyboard). Boie et al. do not disclose integrating their pointing device with a keyboard or a keypad.

Brandenburg et al., in U.S. Pat. No. 5,499,041, teach a keyswitch-integrated pointing device responsive to changes in the force and in the balance of forces applied to a resistor array made from a sheet of a resistive polymeric material. Their resistor array is associated with a single key of a plurality of keys in a keyboard, each of the keys having a respective one of an array of parallel plungers associated therewith. Their device is usable for pointing purposes only after their modified key has been pushed down to its lowermost position.

Selker et al., in U.S. Pat. No. 5,521,596, teach the use of a joystick disposed in the active typing area of a computer keyboard as a pointing device.

Gerpheide et al., in U.S. Pat. No. 5,565,658, teach a touch-pad capacitance-based computer pointing device using two orthogonal arrays of metallic stripes separated by an insulator. They employ an arrangement in which the capacitance measurement is made synchronously with a reference frequency selected to not be coherent with the interfering signal.

The inventor, in his U.S. patent, U.S. Pat. No. 5,730,165, the disclosure of which is herein incorporated by refrence, teaches a capacitive field sensor employing a single coupling plate to detect change in capacitance to ground. This apparatus comprises both a circuit for charging a sensing electrode as well as a switching element to remove charge from the sensing electrode and to transfer it to a charge detection circuit.

Baxter, in a book entitled , "Capacitive Sensors, Design and Applications" (IEEE Press 1997 ISBN 0-7803-1130-2.), describes a capacitive position measuring device having shaped electrodes and using a "slider" pickoff electrode. Baxter also describes the use of a resistive sheet to generate a electric field in a ratiometric position sensor employing a slider pick-off.

DISCLOSURE OF THE INVENTION

A preferred embodiment of the invention provides a multi-electrode capacitive sensor for a computer pointing device, wherein the sensor is integrated with the computer's keyboard and employs ratiometric capacitive sensing means. The preferred sensing means comprises both a circuit for charging a resistive layer and a predetermined number of switching elements, each of which is respectively connected to one of the predetermined number of electrodes, each of which is spaced apart from others of the electrodes. The switching elements, hereinafter referred to as "charge transferring switches" or "discharging switches" remove charge from the resistive layer and transfer it to a multi-channel charge detection circuit. For a one-dimensional pointing device, two or more charge transferring switches and electrodes are required, with two being the preferred number. For a two-dimensional pointing device, three or more charge transferring switches and electrodes are required, with four being a preferred number.

In a particular preferred embodiment, the invention comprises a resistive grid-shaped member having grid lines intermediate adjacent ones of the keys of at least a portion of a computer's keyboard and having a sheet resistance that is in excess of ten ohms per square but less than one megohm per square. Electrodes are attached adjacent the periphery of the resistive grid at a plurality of widely separated points (e.g., the four corners or sides of a rectangular grid) so as to be conterminous with the sensing area. The electrodes provide inputs to a multi-channel charge detector having one channel associated respectively with each electrode. The capacitive sensor is used to determine the position of a user's fingers, hand, or other body part, or of a suitable hand-held object adjacent the keyboard or a defined portion thereof It is a specific object of the invention to provide a computer pointing device comprising a capacitive sensor having a plurality of electrodes disposed adjacent a circuit board or other generally planar fixed support or baseplate underlying a keyboard. This pointing device senses the presence of an object adjacent the keycaps and can be operated by a user who skims his or her fingers over the keyboard without having to depress any of the keys.

It is an object of the invention to provide a multi-electrode capacitive position sensor comprising a circuit for charging a sensing layer and a plurality of switching elements, wherein each of the switching elements removes charge from the sensing layer by means of a respective one of the electrodes and transfers the removed charge to a charge detection circuit. It is a specific object of the invention to provide such a capacitive position sensor as a portion of a computer pointing device.

It is an additional object of the invention to provide a computer pointing device comprising a resistive layer disposed adjacent a keyboard and a capacitive sensing means electrically connected to the resistive layer. It is a specific object of the invention to provide such a pointing device wherein the layer comprises a grid having resistive grid lines disposed between adjacent ones of predetermined keys on the computer keyboard. It is an additional specific object of the invention to provide such a pointing device wherein the layer has a resistivity greater than ten ohms per square and less than one million ohms per square.

It is a further object of the invention to provide a computer mouse or keyboard input device utilizing capacitive sensors that automatically compensate for background capacitances, especially those distributed unevenly about the capacitive sensing area.

It is yet a further object of the invention to provide a computer mouse utilizing capacitive sensors that are immune to external radio frequency interference (RFI), including that from conventional multiplex scanning of an adjacent computer keyboard.

BEST MODE FOR CARRYING OUT THE INVENTION

Figure 1:
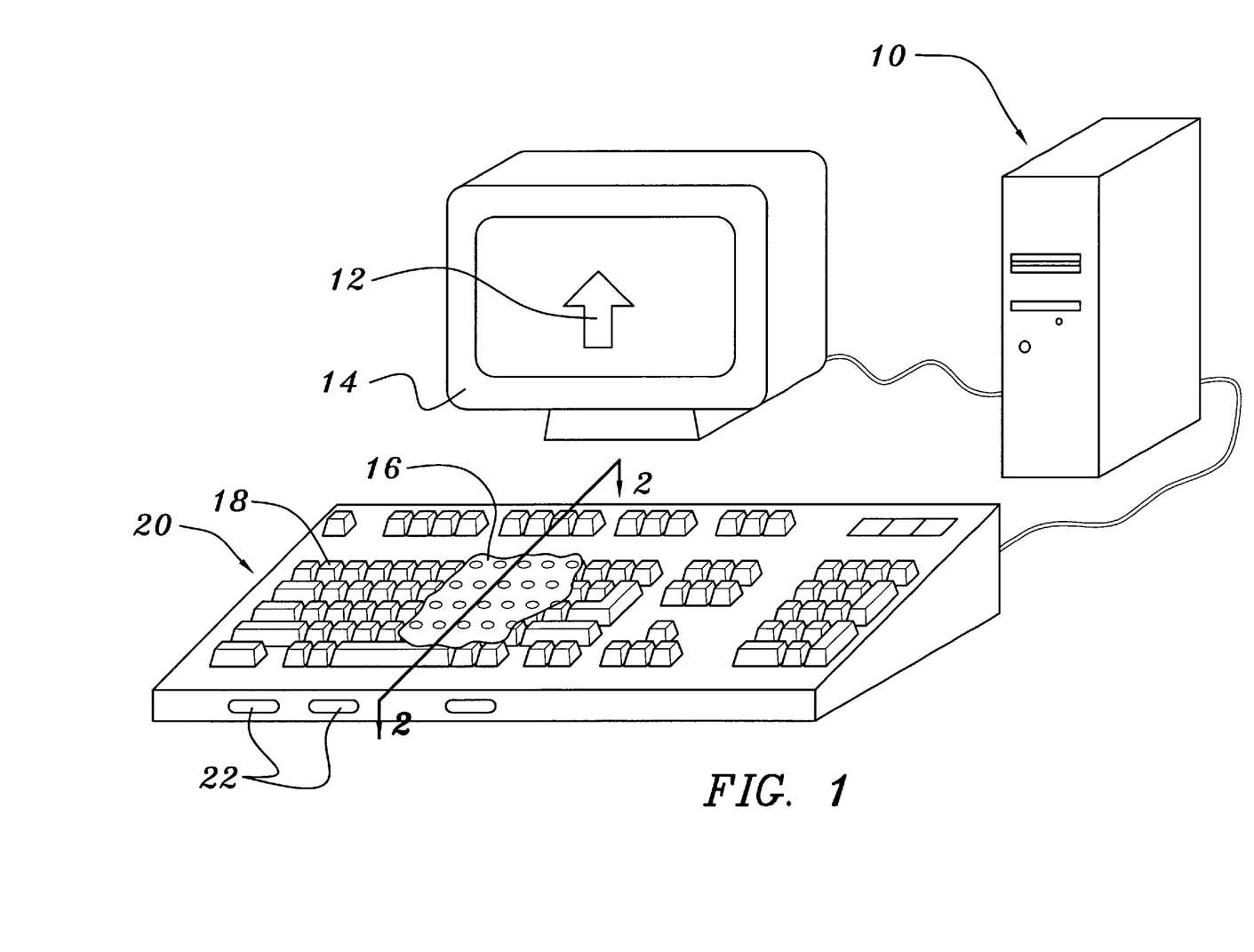
FIG. 1 is a partially cut-away elevational view of a computer keyboard with a pointing device of the invention installed therein.

As is known in the art, a pointing device for a computer 10 allows a user to move a display indicator 12 (which may have the shape of a cross-hairs, arrow, or blinking rectangle, all of which are hereinafter referred to with the conventional term "cursor") about on a display 14. In a preferred embodiment, a pointing device of the invention comprises a resistive sheet or layer 16 disposed in a planar configuration beneath the tops of the keycaps 18 of a portion of a keyboard 20, as well as one or more touch pads 22 preferably disposed on a side or front surface of the keyboard 20. In other embodiments a patterned electrode array 17 can be employed instead of the resistive layer 16. Both of these arrangements provide a keyboard 20 that can be used in a conventional fashion, or that can be switched over to a pointing mode of operation when the user touches a predetermined one of the mode selector pads 22. In the preferred pointing mode the user provides the control input by skimming his or her curled fingers 24 over the tops of the keyboard 20. This can be done without depressing any of the keys in the active typing region of the keyboard, without changing the curl of the fingers, and even without altering the number of fingers proximate to or in contact with the keycaps 18. These user motions, as will be disclosed in detail hereinafter, are sensed by sensing circuitry 40 of the invention, which has an output to cursor location controlling means so that the cursor 12 moves responsive to a motion of the user's hand or fingers 24. It will be understood by those reading the disclosure hereinafter made that although various arrangements are disclosed for a two-dimensional pointing apparatus and method, the same apparatus and method could be employed for one dimensional pointing (e.g., in an arrangement having only two electrodes) or for quasi-three-dimensional pointing—e.g., in an arrangement in which the position of the user's finger along the Z-axis (i.e., perpendicular to the plane of the keyboard)—is measured and used to indicate a mouse click, or a Z-axis position in a three-dimensional graphics program or a computer game. The requisite Z-axis measurement can be done either by observing variations in signal strength from one or more channels of a multi-channel analyzer or by obtaining, from the keyboard controller, an indication that one of the keys had been depressed. It will also be understood that although it is expected that most users of the pointing device of the invention will employ their fingers or hands for pointing, the user could also move some object or another about over the active region for pointing purposes.

The actual active sensing area, e.g., the portion of the keyboard 20 encompassed by or conterminous with the sensing layer 16, can be a sizable fraction of total keyboard area. In various tests, the invention has functioned using as little as one third to as much as the entire keyboard area. In one embodiment, the resistive layer 16 takes the form of a parallelogram encompassing that portion of a conventional QWERTY keyboard bounded by the "u", "m", "/", and "p" keys. Within this active area large scale motions of the screen pointer can be made in response to single motions of the hand. Furthermore, it will be understood to those skilled in the art that the surface area can be made to correspond to absolute coordinate positioning instead of differential positioning as is done with most contemporary pointing devices. Absolute positioning allows the user to mentally map the display screen 14 with hand positions that do not vary. Even when errors are made in hand position relative to the screen, as when the user places her fingertips on a section of keyboard thought to correspond to an icon, only small corrections need be made. This method is conceptually and practically superior to the differential methods employed currently, which reference relative motions only.

A computer mouse, or other pointing device, commonly comprises two or more keys that the user can momentarily actuate, or "click", to select a program feature indicated on the display 14 and pointed to with the cursor 12. In the pointing device of the invention clicking may be provided by the mode selecting means 22. For example, a pointing device of the invention could comprise three touch switches 22, one of which would be used to select the pointing or "mousing" function, and the other two of which could be used analogously to the two buttons on a conventional mouse. It will be understood to those skilled in the art that other approaches to selecting a program feature could also be used with the pointing device of the invention once the pointing mode had been selected. For example, specific keys (e.g., the "e" and "c" keys on a conventional "qwerty" keyboard) in a keyboard that had the resistive sensing layer 16 under only a right-hand portion thereof could be used for clicking whenever the pointing mode was selected. Placement of the field electrodes can be under any desired portion of the keyboard, including the left or right portions of the main keyboard, or under a numeric keypad subsection. If desired, near-duplicate field generating structures can be inserted into both left and right portions of a keyboard and means can be provided to select one of these two portions in order to accommodate both left- and right-handed users.

Figure 2:
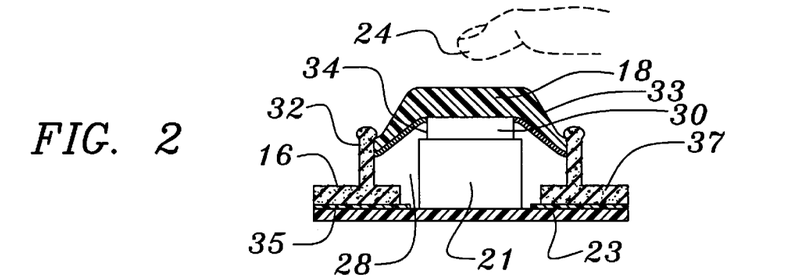
FIG. 2 is a partial cross-sectional view generally taken along the line 2—2 of FIG. 1.

As noted hereinbefore, a preferred sensor comprises a resistive layer 16 disposed across a region As encompassing a plurality of keycaps 18 of a keyboard 20 of the conventional type wherein an upper portion of a key, e.g., a keycap 18, is movable along a line generally perpendicular to a fixed support 23 between a resting position in which the keycap is most distal from the fixed support and an actuating position in which the keycap is most proximal to the fixed support. (Because the keyboard is commonly operated in a horizontal attitude, the most distal position will hereinafter be referred to as the "uppermost" position, while the most proximal will be called the "lowermost"). When the keycap 18 is moved to its lowermost position a characteristic output, uniquely associated with that key, is supplied to the computer. In many keyboards, the moving keycaps communicate with respective momentary contact switches 21 disposed on the fixed surface 23 (e.g., a circuit board) by means such as an array of parallel (and generally vertical) plungers 30. In other keyboards, as is well known in the art, non-contact position sensing means (e.g., a Hall effect device or a dedicated capacitive sensor) are used instead of a switch comprising two metal contacts. It will be clear from the disclosure herein provided that the sensing and pointing means of the invention are independent of the arrangement used by the keyboard for supplying character outputs to the computer.

The preferred resistive layer 16 has a plurality of throughholes 28 formed therethrough, each of the throughholes accommodating a portion of a respective key switch 21 so that the resistive layer is disposed thereabout. It will be understood that in some keyswitch designs the throughhole 28 need only accommodate a relatively narrow plunger 30. In designs that are both more common and more challenging from the viewpoint of trying to dispose a grid-like capacitive sensing surface beneath the keyboard, a relatively wide lower portion of the keyswitch 21 extends upwards from the circuit board 23 through the throughhole. Embodiments of the invention have been made and tested in which the throughholes 28 aggregated to 85% of the total surface area covered by the resistive layer 16. It is also noted that in order to avoid shorting out conducting traces on the printed circuit board 23, an insulating film 35 may be provided between the resistive film 16 and the fixed substrate 23. It will be recognized to those skilled in the art of capacitive sensing that conductive sheets (not shown) may be required at various locations on or behind the circuit board in order to shield the back side of the sensing array and to provide a ground plane. Although pointing devices of the invention have been retrofitted into several commercially available keyboards, it is expected that a production version of the sensor will be designed in conjunction with the associated keys and circuit board.

It will be recognized from the ensuing disclosure of the method and apparatus for extracting electrical charge from the resistive layer that although the preferred embodiment may function with a diaphanous resistive layer 16, the invention could more easily function by using a resistive layer that was free of throughholes. A resistive layer of that sort could, for example, serve as one of the layers of material making up a membrane or capacitive keyboard. Touchscreens and keyboards of this type, because they have little or no perceptible key motion, are generally perceived as being inconvenient to use, but, because they are easily environmentally sealed, are often used in industrial and food service applications.

In order to improve the electrical uniformity of the sensing layer, one may employ a resistive layer of the sort depicted in FIG. 2 that has upstanding wall-like portions 32 filling gaps between adjacent keycaps 18. These upstanding wall-like portions 32 may extend in only one direction along the keyboard (e.g., along the QWERTY keyboard's X-axis as a first ridge disposed between the uiop[keys and the jkl;' keys and as a second ridge disposed between the jkl,' keys and the nm,./keys) or may extend in both the X and Y directions so as to define an "eggcrate" set of walls surrounding each key in an active portion of the keyboard. Moreover, one may elect to coat the bottom and/or bottom edges of the keycaps 18 with a conductive film 34 making electrical contact with the filler walls 32. In an embodiment comprising keycaps with conductive coating and an eggcrate-like resistive layer 16 having upstanding wall portions 32 extending along both keyboard axes, it will be recognized that the portion 37 of the resistive layer 16 that is parallel to the printed circuit board 23 is electrically superfluous and may be dispensed with unless the apparatus is more conveniently manufactured with the portion 37 present. Thus, the resistive layer 16 may be a generally flat geometrical sheet, or it may comprise a honeycomb array of short tubular segments. Moreover, it will be recognized that a variety of resistive keycap portions can be used instead of the preferred film 34. For example, one could make the entire keycap of a material having an appropriate resistivity, or could fill the underside of a keycap with a thick annular resistive body—e.g., formed by injecting a curable resistive resin into the underside of each keycap. As an additional example, one may consider modifying a prior art membrane keyboard (which already comprises a conductive elastomeric layer having an appropriate sheet resistivity for use in the present invention) by reshaping the conductive layer and/or attaching electrodes thereto.

Although a resistive layer having a honeycomb structure, as described supra, can be made from a plurality of tubular segments joined at points of circumferential contact among adjacent ones of the segments, it will be noted that it is the electrical contact among segments that is of significance, and not the mechanical joining. Thus, one could configure a "phantom layered" keyboard in which each keycap used in a active region of the keyboard had a resistive skirt on its outside lateral surface 33 (e.g., if the keycap was made of a material having an appropriate resistivity, or if the lateral walls of the keycap were coated with such an appropriate film 34) and in which all of those keycaps were in lateral rubbing contact. In this arrangement the array of resistive skirts would be electrically and functionally equivalent to the physical honeycomb array forming the layer 16 depicted in FIG. 2

It can be appreciated that the mechanical interface between grid and keys as shown in FIG. 2 can be altered significantly and still operate in general accord with the invention. The intent is merely to make contact substantial enough between grid and keys, with sufficient reliability, so as to allow finger(s) to be capacitively detected in a smooth and uninterrupted fashion without lumpiness in the detection field. Non-linearities in the field occurring over the planar surface can be corrected for in software with a look-up table and an interpolation method, or in a mathematical algorithm designed for the purpose. Moreover, although only a single finger 24 is shown in the depiction of FIG. 2, if the user skims more than one finger (e.g., the depiction of FIG. 5, which is believed to be an ergonomically preferable approach) over the active pointing area of the keyboard, he or she will find a smoother response because the centroid of the set of fingers is sensed, thus reducing any effects of key-to-key discontinuity.

Figure 3:
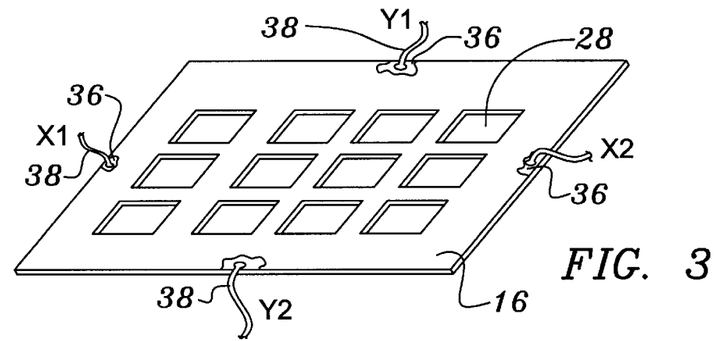
FIG. 3 is a plan view of a preferred configuration of a resistive layer portion of the invention.

In the preferred embodiment, the layer 16 is a four-sided plane figure with a metal electrode 36 at each of its four corners (not shown) or at the center points of each of its four sides, as depicted in FIG. 3. Each of the electrodes 36 is connected by a wire 38 to a respective input of a four channel capacitive sensing circuit 40 of a sort to be discussed hereinafter with particular reference to FIGS. 8–10. As a user's fingertips 24 travel across the keys, the resultant increased capacitance is sensed by each channel of the four channel sensor 40. Ratios of the outputs of the four channels are taken, and with further processing, such as two dimensional interpolation and lowpass filtering, the fingertips' position can be ascertained with reasonable precision. It will be understood to those skilled in the art that such a ratiometric approach could be made to work with three or more contacts to the resistive layer 16. Both the simplicity of algorithmic processing and the generally rectangular shape of the display 14 on which the cursor 12 is to be moved, however, indicate that a four electrode measurement is to be preferred. Moreover, it is known in the art that nonlinearities arising at the edges of the array or arising elsewhere on the sheet due to a given choice of electrode configuration can be compensated for via re-mapping of coordinates in software using a two dimensional lookup table with interpolation, or, by recourse to known calculational procedures.

The four-sided preferred layer 16 of the invention, for example, may be disposed under the keycaps 18 of a conventional qwerty keyboard with a first x-axis electrode (denoted as X1) adjacent the "D" key, a second x-axis electrode (denoted as X2) adjacent the "L", a first y-axis electrode adjacent the "7" and the second y-axis electrode adjacent the "N". This arrangement has provided the easiest computation set-up of all the pointing devices of the invention that have been tested to date. The ratiometric processing consists of determining how far to the left or right the user's finger 24 is from the center of the layer by recourse to C(X1), the capacitance measured at X1, and C(X2), the capacitance measured at X2. That is, the relative displacement is C(X1)/C(X2) if C(X1)>C(X2), and is C(X2)/C(X1) if C(X1)<CK2). The same sort of processing is used for the Y axis. It will be understood to those skilled in the art that one may normalize the capacitance values to compensate for hand size and finger position, e.g., by subtracting a correction term K from each value, so the relative X-axis displacement is calculated from (C(X1)–K)/(C(X2)–K), etc.

Figures 6, 7:
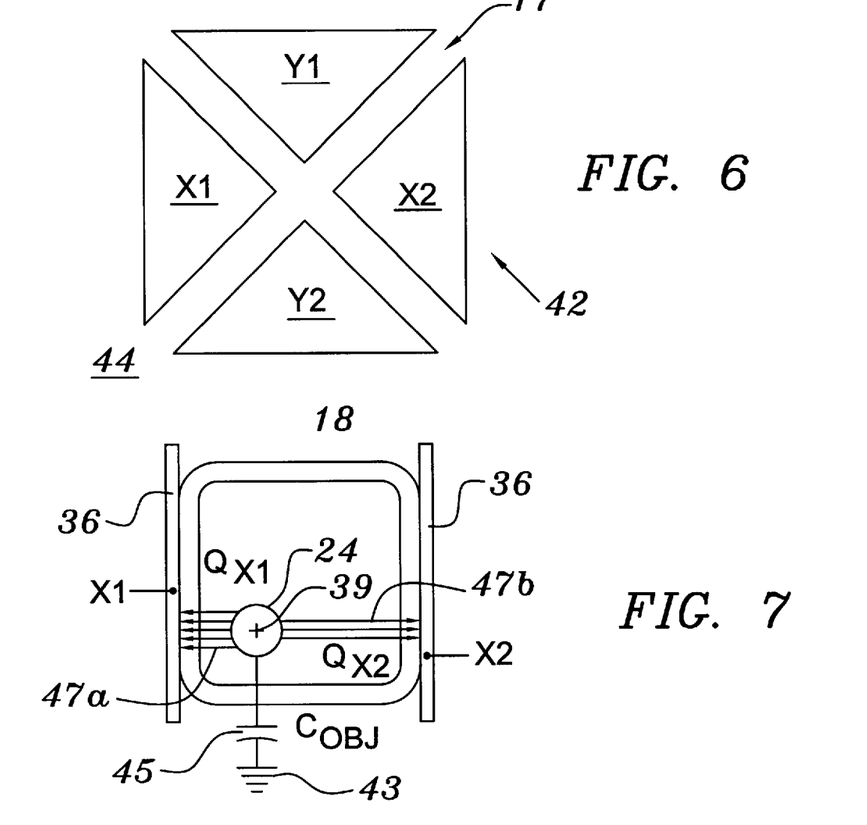
FIG. 7 is a partly schematic plan view of a single keycap configured for use with a one-dimensional capacitive position sensor.

As an illustrative case for explaining the ratiometric method of the invention, consider a one-dimensional position measurement arrangement using a single keycap as the active sensing region (see FIG. 7). Two metallic electrodes 36 labeled X1 and X2 in the drawing) are in electrical contact with opposite sides of the keycap 18. A centroid, or effective point of contact 39, of a pointing object (e.g., a user's finger 24) is depicted as being in touching, or near-touching, contact with the keycap 18 and is shown as being coupled to an electrical ground 43 by its capacitance 45 (denoted in FIG. 7 as $C_{OBJ}$). Prior to discharge, the same potential is applied to both electrodes 36 so there is no electric field gradient across the key. When both electrodes 36 are discharged simultaneously the difference in capacitance between the effective point of contact 39 and the two electrodes ensures that a greater amount of the charge from the object 24 flows to the closer of the two electrodes. In the depiction of FIG. 7 the object 24 is shown as having an initial positive charge with respect to ground 43, and the two different quantities of charge ($Q_{X1}$ and $Q_{X2}$) are represented by sets of arrows 47a, 47b having different numbers of arrows in the two sets. After the charge has been completely transferred, the electrodes 36 and object contact point 39 are again at the same potential.

It is noted that the ratiometric capacitive measurement, when applied to computer pointing, is not confounded by finger height above the keys, which would otherwise lead to erroneous and unpredictable positioning. By allowing and requiring the amplitude of two capacitive signals to be processed ratiometrically for each of the two planar dimensions, signal amplitude (which is related to fingertip surface area and height above the keys) becomes much less of an independent variable. This processing should occur in each of the two dimensions. Should the signal of any one of the sides of the layer fall below a minimally acceptable threshold value, processing may be halted and the screen pointer held stationary.

In order to calculate a position centroid using the simple geometry of the preferred embodiment, the value of the resistance of the resistive film 16 is of some concern. If, for example, this layer were a perfect conductor it would charge and discharge instantaneously and all four capacitance values would be identical, regardless of where the user's finger was placed. More generally, a lower limit on the sheet resistance is dictated by the desired spatial resolution. This lower limit can be extended to below one hundred ohms per square by putting in a summing junction (e.g., using an op amp). It will be understood that one upper limit on the sheet resistivity is set by speed requirements—i.e., the time required to drain charge from the layer should not be so long as to cause a perceptible lag in pointing. In most cases, however, the working upper limit on sheet resistivity arises from inhomogeneity—i.e., as sheet resistivity increases many resistive grid arrangements of the invention become too inhomogeneous to be useful. Generally, the capacitance from film to fingers is less than about 1 picofarad and the relevant RC time constant must be such that the ratios can be repeatably and accurately determined without severe amplification lest noise affect the measurement. It has been found that in order to properly discriminate among the sub-picofarad values associated with a user's fingers spaced slightly apart from the keyboard one preferably employs a resistive layer 16 having a sheet resistivity on the order of several kilo-ohms per square, a value that can be obtained by making the layer 16 from a graphite-loaded paper or from an appropriate polymer-based conductor.

One may note that resistors made from materials with sheet resistivities in the preferred k$\Omega$/square range commonly suffer from problems associated with spatial inhomogeneities across a sample that is several centimeters on a side, with lack of sample-to-sample reproducibility, and with high temperature coefficients of resistance. All of these effects could be deleterious to a capacitive or resistive method of moving a cursor to absolute coordinates on a display, but have not been found to be of serious concern for a pointing device. One reason for the lack of a problem appears to be that the human operator can adjust to accommodate for such effects—e.g., a highly inhomogeneous sheet may be perceived as being the same as a conventional mouse with a slight acceleration curve. Also, ratiometric measurements are not affected by a high temperature coefficient of resistance as long as all portions of the layer experience the same temperature change.

Similar conductive layer methods are well described in the patent literature in conjunction with pointing devices, however none describe a mode of operation whereby a group of fingers may be spaced a distance apart from the conductive film by a gap comprising plastic, or plastic and air.

It will be understood to those skilled in the arts of capacitive proximity sensing that a ratiometric capacitive sensor can also be made using an array of patterned metallic electrodes 42 disposed on an insulating layer or substrate 44, where the electrode geometry is selected to generate a varying capacitive output as a proximate body (e.g., a stylus or the user's finger) moves across the electrode array. It may be noted that the shaped electrode embodiments also preferably employ an overlay of some sort to set a minimum distance between the pointing object and the electrodes in order to prevent a user from becoming aware of the discrete electrodes. A sufficiently thick piece of plastic above the shaped electrodes, for example, "blends" the fields from the various electrodes so as to provide a smooth response to the users pointing motions.

Figure 4:
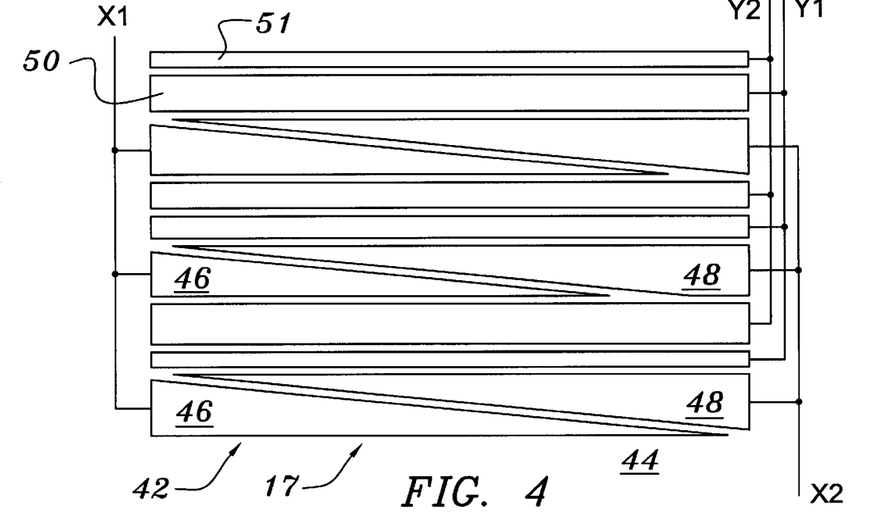
FIGS. 4, 5 and 6 are plan views of alternate electrode array configurations.

As an example, consider the array 42 depicted in FIG. 4. This arrangement comprises four interspersed electrode sets, two for each dimension. The x-axis sets, which are triangular, are easier to see and understand. A first set of triangles 46 are all electrically connected together to an output buss denoted as X1. The second set 48 are also connected together to an output labeled X2. The position of a user's hand with respect to the x-axis can be ascertained from the ratio of signals from X1 and X2. Because capacitance is directly proportional to surface area, and because the plates connected to X1 aggregate to a greater surface area to the left than do the plates connected to X2 (and vice versa) the ability to take the ratio of X1/X2 or X2/X1, as discussed supra, is preserved so long as a great enough finger area is over the pattern 42 at a close enough range to provide sufficient signal strength. This design also prevents fingertip location on the Y axis from affecting the X measurement. A corresponding set of plates are connected to the Y1 and Y2 busses The Y-connected set is also ratiometric, although in a manner different from the X sets. The Y set consists of alternating Y1-connected and Y2-connected rectangular strips having a y-axis dimension that varies with placement in such a manner so as to create a smoothly varying ratio of surface area between Y1 and Y2 with location Y. The sum of each pair (e.g., the strips labeled 50, 51) of the y-axis strips is made constant so that the sum of the capacitance is the same for any two paired stripes, i.e., C(Y1) +C(Y2)=C (Y) for each pair of strips. Then, as the user's fingers move along the y-axis, the detected capacitance ratio is measured in the same manner as the CX1)/C(X2) ratio, i.e. the largest value becomes the numerator.

Figure 5:
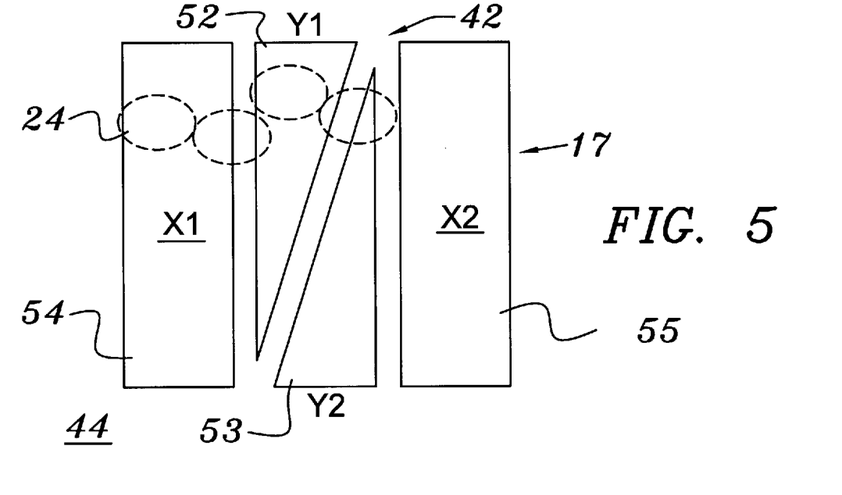

Yet another electrode arrangement is depicted in FIG. 5, which also depicts the position of four of a user's fingers in phantom. The triangular y-axis electrodes 52, 53 are used for ratiometric surface area determination as described in conjunction with the triangular x-axis electrodes 46,48 depicted in FIG. 4. The x-axis determination is done in a yet different manner—it localizes the x-axis position of the user's hand according to the number of fingers 24 (actually the ratio of finger surface area) disposed over the two x electrodes 54, 55. Should a hand stray outside the boundary zone (either to the left or right) a respective x-axis output will experience a dramatic loss in signal and processing will ordinarily be made to cease and the pointer or cursor will stop moving.

FIG. 6 depicts still another electrode arrangement in which a pair of triangular x-axis electrodes 46, 48 and a pair of triangular y-axis electrodes 52, 53 are employed to detect the centroid of a set of user's fingers disposed above the patterned electrode array in accordance with the methods described supra.

It will be noted that although in the preferred embodiment using a resistive sheet 16, the sheet may be charged through any one of the electrodes 17, but all of the electrodes 17 must be discharged simultaneously. One may note that if the electrodes were connected to the charge sensor sequentially, rather than simultaneously, the charge would be transferred via the first electrode connected, and the apparatus would fail to provide an indication of position. In the embodiments using shaped metal electrodes disposed on an insulating layer it is necessary to connect each of the electrodes to a charging source, but it is not necessary to discharge all of them simultaneously.

Figure 8:
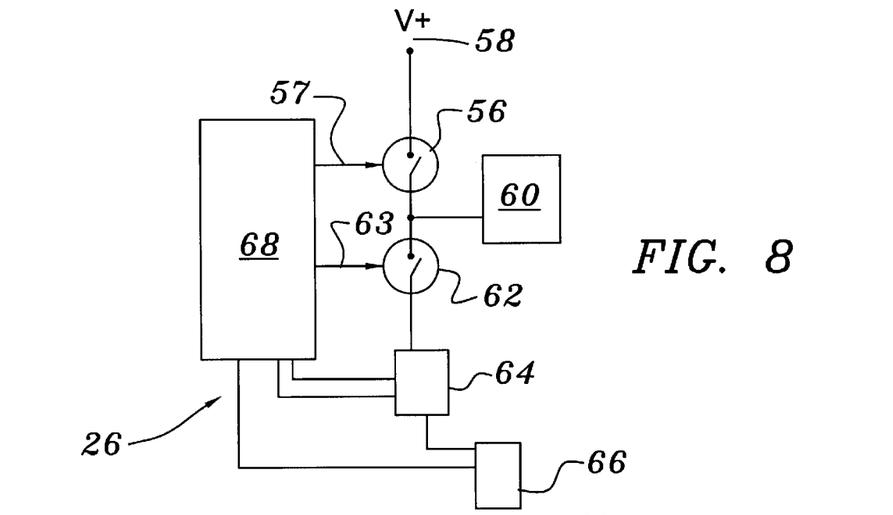
FIG. 8 is a general schematic diagram of a circuit used for charging and discharging a capacitive sensor.

Turning now to FIG. 8, one finds a block diagram of a charge transfer measurement circuit similar to one described by the inventor in his U.S. patent, U.S. Pat. No. 5,730,165. Here, a charging switch 56, which is preferably a low resistance switching element, such as a transistor controlled by a signal on a charging control line 57, is used to transfer charge from a voltage supply 58 to a capacitive sensing electrode 60, which may be either one of the electrodes 36 disposed on the resistive sheet 16 or one of an array of patterned electrodes 42 disposed on an insulating substrate 44. The capacitive sensing electrode is preferably connected for a first interval, the length of which is selected to be long enough to allow the sensing electrode 60 to reach a saturation voltage, following which the charging switch 56 is opened, and, after waiting for a suitable short period to prevent switch crossover conduction, a signal sent over a discharging control line 63 causes a charge transferring switch 62 to close and thereby to connect the sensing electrode 60 to a charge measurement means 64 so as to rapidly discharge the sensing electrode 60 thereinto. Because the switches 56, 62 have intrinsic internal capacitances which inject charge into the charge detector 64, and because the sensing electrode 60 may have a very large inherent capacitance, it is often desirable to cancel these charges as filly as possible to prevent saturating the charge detector 64 with these background signals. To this end, a charge subtractor or cancellation circuit 66 may be provided in some embodiments of the invention to remove charge from the charge detector 64. Because only the charge detector's offset is affected by the charge subtractor 66, there is no change in gain of the charge detector and the overall system sensitivity remains unaffected. As is conventional in contemporary electronic designs, one may conveniently provide for the operation and control of the various circuit functions discussed with respect to FIG. 8 by means of a microprocessor 68.

Figure 9:
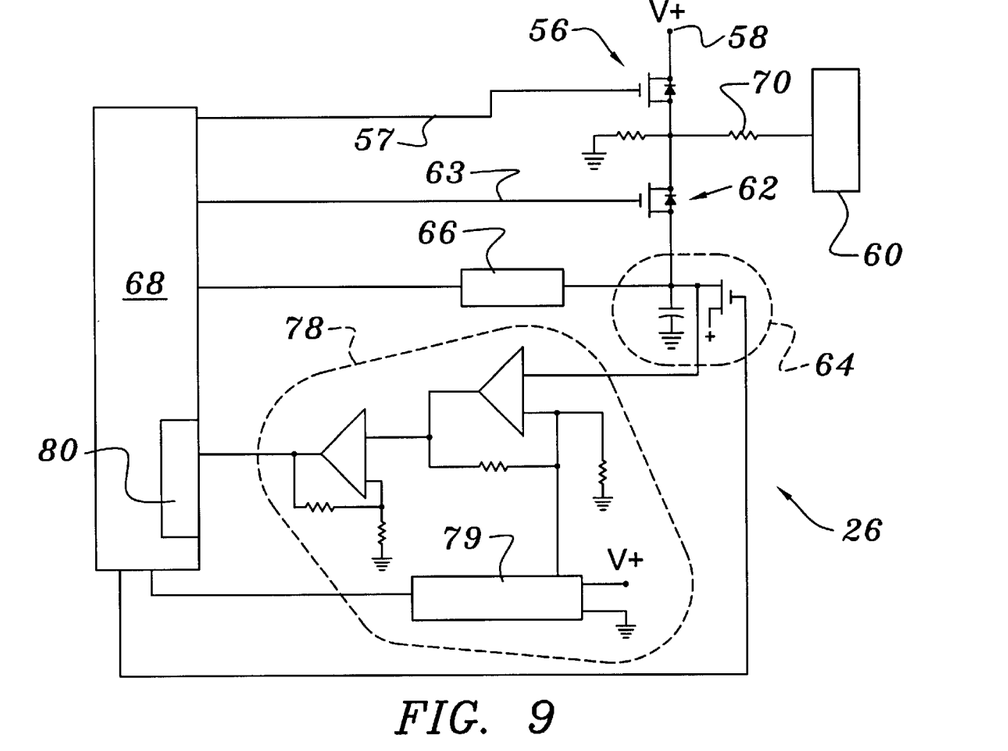
FIG. 9 is a schematic diagram of a preferred circuit for measuring a capacitance change from a single capacitive sensor, as may be used for sensing a position of a user's hand in the pointing device of the invention.

FIG. 9 shows a schematic circuit diagram of an exemplar circuit of the sort described hereinbefore with respect to FIG. 8. In this embodiment the switches 56, 62 are p- and n-channel mosfet transistors of types BSS110 and BSN10, respectively, both of which have integral source-drain diodes. An optional resistor 70 adds damping and prevents ringing in the line running to the sensing electrode 60. Although in the preferred embodiment the switches 56, 26 are pulsed directly from the microprocessor 68 with 1 µsec pulses, earlier embodiments of the circuit operated with external pulse networks (not shown). An amplifier circuit 78 is used with an 8-bit DAC 79 to provide an adjustable measurement offset of the signal. The analog to digital converter 80 integral to the preferred PIC16C74 microcontroller 68 is only 8 bits, and thus has limited dynamic range. By adding a large external gain with offset capability, the system obtains an 8-bit 'window' subrange into a 13-bit measurement space (3 offset bits provide overlap within each 8-bit window subrange).

Figure 10:
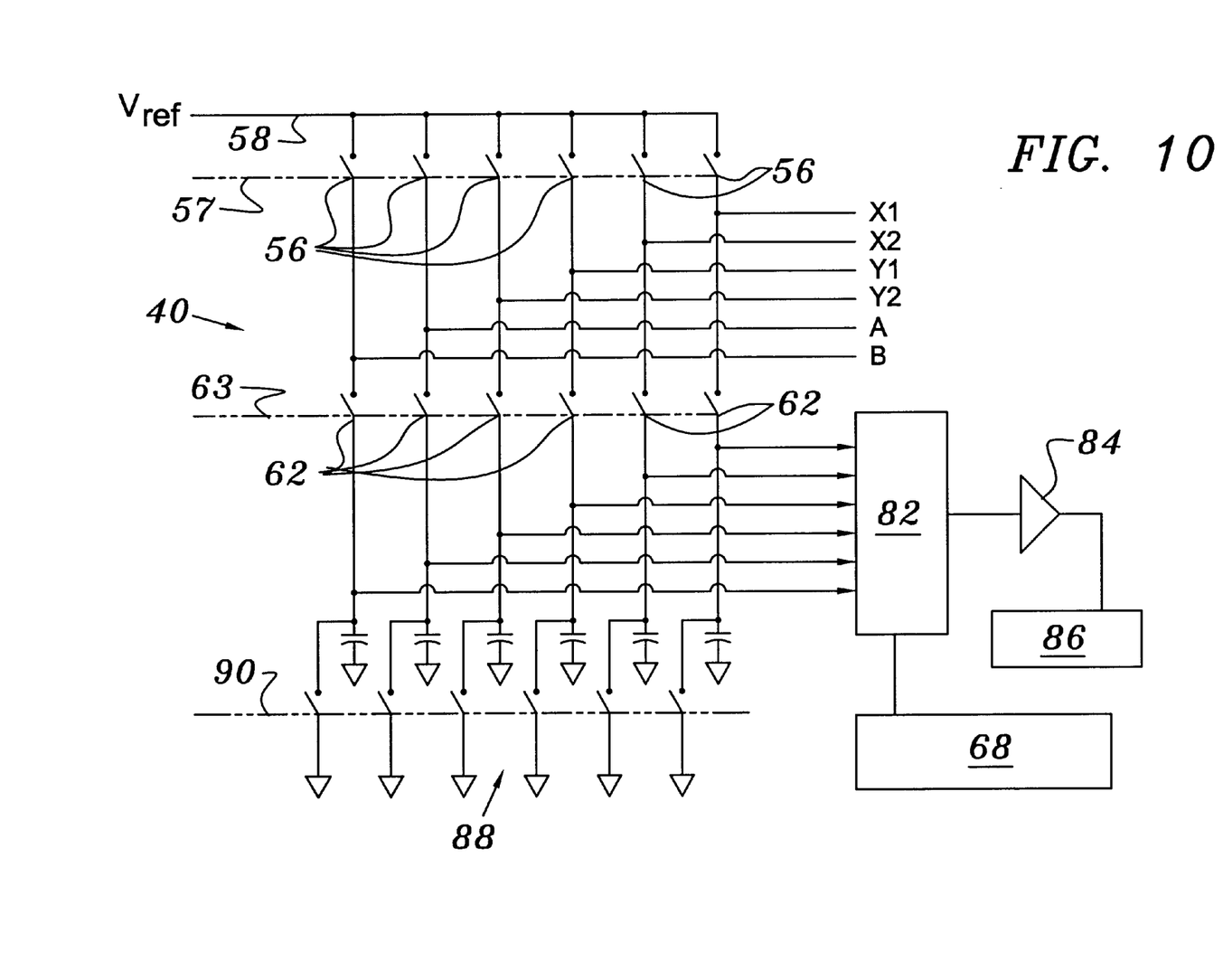
FIG. 10 is a schematic diagram of a preferred circuit for sensing the position of a user's hand adjacent an array of capacitive plates.

Turning now to FIG. 10, one finds a schematic depiction of a four channel sensor circuit 40 for use with any of the capacitive position sensing electrode arrangements 60 of the invention. In this figure the sensor circuit 40 is depicted as having the four capacitive electrode inputs hereinbefore labeled as X1, X2, Y1, and Y2, as well as having two inputs (labeled as A and B) from respective capacitive touch pads 22. A charging control line 57 in this embodiment is used to simultaneously charge all six of the capacitive inputs X1, X2, Y1, Y2, A & B. It will be understood to those skilled in the art that in an embodiment of the invention using a single resistive grid or layer 16, a single charging switch 56 could be employed to charge the layer because all four electrodes 36 are connected through the layer 16. Moreover, it may be noted that in some embodiments of the invention the charging control line 57 may be omitted and the charging switches 56 replaced with a pull-up resistor constantly connecting the various electrodes to the voltage supply. The pull-up resistor has a resistance chosen to provide an RC time constant greater than the discharge interval used to discharge the layer into the array of charge detectors. In one preferred embodiment this resistance is between fifteen and twenty five thousand ohms. Regardless of how one chooses to charge the layer 16, however, it is preferred that the four channels of charge transfer act simultaneously when transferring charge to the charge detectors—e.g., as indicated in FIG. 10 by the use of a single discharging control line 63 to discharge all the charged electrodes. After the transfer, or burst of transfers, has occurred, an analog multiplexer 82 selects which of the six charge detector capacitor outputs is to be fed to the amplifier 84 and ADC 86 and thence to the microcomputer. Additionally, an array of reset switches 88 controlled by a reset control line 90 is activated after each pulse or burst of pulses to reset the capacitive inputs to a known reference (e.g., to ground). It will be clear to those skilled in the art many of the circuit elements depicted in the FIG. 9 in the detailed schematic for a single channel sensor have been omitted from the schematic of FIG. 10 in the interest of clarity.

INDUSTRIAL APPLICABILITY

The invention provides apparatus and method for human-computer interfaces, and is believed to be of particular utility when used with a small, and generally, portable computers of the types commonly referred to as "notebook, "laptop" or "palmtop" computers, as well as "personal digital assistants" "network computers", and the like.

What is claimed is:

1. A capacitive sensor for measuring a position of an object adjacent a homogeneous resistive sensing layer, the presence of the object changing an electric capacitance to a ground, the sensor comprising:

a predetermined number, greater than one, of electrodes spaced apart around a periphery of the sensing layer, the electrodes conterminous with the sensing layer, the sensing layer disposed in a planar configuration beneath the tops of a plurality of keys of a keyboard operatively connected to a computer, the sensing layer further comprising an upstanding portion between two adjacent ones of the keys;

the predetermined number of charge detectors, each of the charge detectors respectively associated with one of the electrodes;

means for selectively connecting at least one of the electrodes to a voltage source;

the predetermined number of charge transferring switches, each having an open state and a closed state, each charge transferring switch, when in its closed state, respectively electrically connecting the electrode associated therewith to the charge detector associated therewith, each charge transferring switch, when in its open state, respectively electrically disconnecting the electrode associated therewith from the charge detector associated therewith; and means for closing all the charge transferring switches simultaneously.

2. In a pointing device connected to a computer, wherein a position of an object is detected by means for measuring an electrical capacitance to a ground, wherein a cursor on a display operatively connected to the computer moves responsive to a change in the detected position, and wherein a keyboard operatively connected to the computer comprises an active typing area comprising a first predetermined number of keys, an improvement comprising:

a voltage source;

means for selectively connecting the voltage source to at least one of a second predetermined number, greater than one, of electrodes spaced out along a periphery of a resistive layer disposed beneath a selected portion of the active typing area, the resistive layer comprising a plurality of throughholes, each of the throughholes accommodating a portion of a respective one of those keys disposed within the selected portion of the active typing area;

wherein each of the electrodes is separately electrically connected to a respective charge transferring switch having a dosed state and an open state, each charge transferring switch electrically connecting the electrode associated therewith to a respective charge detector when in the closed state, each charge transferring switch, when in the open state, not connecting the electrode associated therewith to the respective charge detector, each of the charge detectors having a respective output representative of the electrical capacitance to the ground; and a calculation means for calculating the position of the object from a ratio of the outputs.

3. The pointing device of claim 2 wherein each key comprises a keycap movable perpendicular to a fixed support between an uppermost and a lowermost position, and wherein each key provides a respective output when the keycap associated therewith is in its lowermost position.

4. The pointing device of claim 2 wherein the resistive layer comprises an upstanding portion between two adjacent ones of the keys disposed within the selected portion of the active typing area.

5. The pointing device of claim 4 wherein the upstanding portion comprises a ridge.

6. The pointing device of claim 4 wherein the upstanding portion surrounds one of the keys.

7. The pointing device of claim 2 wherein the resistive layer has a sheet resistivity greater than ten Ohms per square and less than one million Ohms per square.

8. The pointing device of claim 2 wherein the second predetermined number is four.

9. The pointing device of claim 2 further comprising an analog multiplexer having a respective input from each of the charge detectors and wherein the calculation means comprises a microprocessor having an input from the analog multiplexer.

10. The pointing device of claim 2 further comprising means for closing all the charge transferring switches simultaneously.

11. In a pointing device connected to a computer, wherein a position of an object is detected by electrical capacitance measurement means having an output representative of a capacitance to an electrical ground, wherein a cursor on a display operatively connected to the computer moves responsive to a change in the detected position of the object, and wherein a keyboard operatively connected to the computer comprises an active typing area comprising a first predetermined number of keys, an improvement comprising:

a second predetermined number, greater than one, of electrodes spaced apart upon a homogeneous resistive layer disposed in a planar configuration beneath the tops of those keys within a selected portion of the active typing area, wherein the resistive layer comprises a plurality of throughholes, each of the throughholes accommodating a portion of a respective one of those keys within the selected portion of the active typing area; and wherein the capacitance measurement means comprises:
a voltage source;
means connecting the voltage source to at least one of the electrodes; and
the second predetermined number of charge transferring switches, each charge transferring switch having a closed state and an open state, each charge transferring switch, when in its closed state respectively electrically connecting that one of the electrodes uniquely associated therewith to a respective charge detector having a respective output, each charge transferring switch, when in its open state, not connecting the electrode associated therewith to the respective charge detector; and
calculation means for calculating the position of the object from a ratio of the outputs of the charge detectors.

12. The pointing device of claim 11 wherein the resistive layer comprises a plurality of throughholes, each of the throughholes accommodating a portion of a respective one of those keys within the selected portion of the active typing area.

13. The pointing device of claim 12 wherein the upstanding portion comprises a ridge.

14. The pointing device of claim 12 wherein the upstanding portion comprises a wall surrounding one of the keys.

15. The pointing device of claim 11 wherein the resistive layer has a sheet resistivity greater than ten ohms per square and less than one million ohms per square.

* * * * *